United States Patent
Kadoi

(10) Patent No.: US 10,620,658 B2
(45) Date of Patent: Apr. 14, 2020

(54) VEHICLE PEDAL DEVICE

(71) Applicant: Toyota Jidosha Kabushiki Kaisha, Toyota-shi, Aichi-ken (JP)

(72) Inventor: Hironori Kadoi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/142,816

(22) Filed: Sep. 26, 2018

(65) Prior Publication Data

US 2019/0160943 A1 May 30, 2019

(30) Foreign Application Priority Data

Nov. 28, 2017 (JP) ................................. 2017-227532

(51) Int. Cl.
| | |
|---|---|
| *G05G 1/44* | (2008.04) |
| *B60K 26/02* | (2006.01) |
| *F16H 21/44* | (2006.01) |
| *G05G 5/05* | (2006.01) |

(52) U.S. Cl.
CPC .............. *G05G 1/44* (2013.01); *B60K 26/02* (2013.01); *F16H 21/44* (2013.01); *B60K 2026/026* (2013.01); *G05G 5/05* (2013.01); *G05G 2505/00* (2013.01); *Y10T 74/20534* (2015.01)

(58) Field of Classification Search
CPC .............. B60K 26/02; B60K 2026/026; Y10T 74/20534; G05G 1/30; G05G 1/44; G05G 1/445

See application file for complete search history.

(56) References Cited

U.S. PATENT DOCUMENTS

| | | | | |
|---|---|---|---|---|
| 9,411,359 | B2 * | 8/2016 | Min | ........................ G05G 1/44 |
| 2007/0155586 | A1 * | 7/2007 | Kurokawa | ............ B60K 26/02 |
| | | | | 477/115 |
| 2009/0293666 | A1 | 12/2009 | Kim et al. | |
| 2010/0071500 | A1 * | 3/2010 | Ohtsubo | ................... G05G 1/36 |
| | | | | 74/513 |
| 2013/0087006 | A1 * | 4/2013 | Ohtsubo | ................. B60R 13/02 |
| | | | | 74/493 |
| 2013/0305874 | A1 * | 11/2013 | Fuller | ....................... G05G 1/44 |
| | | | | 74/513 |
| 2017/0240044 | A1 * | 8/2017 | Tabata | .................... B60K 26/02 |
| 2018/0052483 | A1 * | 2/2018 | Brown | ...................... B60T 7/04 |

FOREIGN PATENT DOCUMENTS

| | | |
|---|---|---|
| JP | 2007-191009 A | 8/2007 |
| JP | 2009-292458 A | 12/2009 |
| JP | 2010-073143 A | 4/2010 |

* cited by examiner

*Primary Examiner* — Prasad V Gokhale
(74) *Attorney, Agent, or Firm* — Dinsmore & Shohl LLP

(57) ABSTRACT

A vehicle pedal device includes a housing installed on a floor portion of a vehicle, a support provided behind the housing in a vehicle front-rear direction, and provided for a lower portion of the housing, and a pedal pad disposed while being inclined such that the pedal pad extends in a direction from the support to a position above the housing with a lower end portion of the pedal pad being rotatably supported by the support. The diameter of the largest virtual circle accommodated in a space defined by the pedal pad in a state of being maximally stepped on, the housing, and the support is larger than the diameter of the smallest virtual circle being in contact with the pedal pad in a state of being not stepped on and the housing as seen in a direction toward the pedal pad from a lateral side.

17 Claims, 10 Drawing Sheets

VEHICLE PEDAL DEVICE

CROSS-REFERENCE TO RELATED APPLICATIONS

This application claims priority to Japanese Patent Application No. 2017-227532 filed on Nov. 28, 2017, which is incorporated herein by reference in its entirety including the specification, drawings and abstract.

BACKGROUND

1. Technical Field

The disclosure relates, to a vehicle pedal device.

2. Description of Related Art

Japanese Unexamined Patent Application Publication No. 2010-073143 (JP 2010-073141 A) discloses a vehicle pedal device in which a lower end portion of a pedal pad is rotatably supported by a support provided on a lower portion of a housing.

SUMMARY

In the case of the vehicle pedal device disclosed in JP 2010-073143 A, when the pedal pad is stepped on after a foreign substance enters an area between the housing and the pedal pad, the foreign substance may be interposed between the housing and the pedal pad and a load may act on the support with the foreign substance as a fulcrum. Particularly, when the foreign substance is interposed at a position near the lower end portion (supported point) of the pedal pad, a relatively high load acts on the support due to the principle of leverage.

The disclosure provides a vehicle pedal device with which it is possible to prevent a load from acting on a support when a pedal pad is stepped on even in a case where a foreign substance enters an area between a housing and the pedal pad.

An aspect of the disclosure relates to a vehicle pedal device including a housing installed on a floor portion of a vehicle; a support provided behind the housing in a vehicle front-rear direction and provided for a lower portion of the housing; and a pedal pad to be stepped on, the pedal pad being disposed while being inclined such that the pedal pad extends in a direction from the support to a position above the housing with a lower end portion of the pedal pad being rotatably supported by the support. A diameter of a largest virtual circle accommodated in a space defined by the pedal pad in a state of being maximally stepped on, the housing, and the support is larger than a diameter of a smallest virtual circle being in contact with the pedal pad in a state of being not stepped on and the housing as seen in a lateral view of the pedal pad.

The "rear side in the vehicle front-rear direction" in the aspect of the disclosure is the "rear side in the vehicle front-rear direction in a state where the housing is installed on the floor portion of the vehicle".

In the case of the vehicle pedal device according to the aspect of the disclosure, the pedal pad which is disposed while being inclined such that the pedal pad extends in the direction from the support to the position above the housing with the lower end portion of the pedal pad being rotatably supported b the support is to be stepped on.

Here, the size (diameter) of the largest foreign substance that can pass through an area between the pedal pad and the housing in a state where the pedal pad is not stepped on corresponds to the diameter of the smallest virtual circle.

In the vehicle pedal device according to the aspect of the disclosure, the diameter of the largest virtual circle accommodated in a space defined by the pedal pad in a state of being maximally stepped on, the housing, and the support is larger than the diameter of the smallest virtual circle. Therefore, the foreign substance entering the space after passing through the area between the pedal pad and the housing is likely to be retained in the space. Accordingly, the foreign substance is less likely to be interposed between the pedal pad and the housing or the pedal pad and the support when the pedal pad is stepped on and a load is prevented from acting on the support with the foreign substance as a fulcrum.

Therefore, with the configuration according to the aspect of the disclosure, it is possible to prevent a load from acting on the support when the pedal pad is stepped on even in a case where the foreign substance enters the area between the housing and the pedal pad.

In the vehicle pedal device according to the aspect of the disclosure, a portion of an upper surface of the support that defines the space may be provided with a recess portion open to an upper side in a vehicle height direction, the recess portion being positioned ahead of a supporting position, at which the lower end portion is connected to the support, in the vehicle front-rear direction.

The "front side in the vehicle front-rear direction" in the aspect of the disclosure is the "front side in the vehicle front-rear direction in a state where the housing is installed on the floor portion of the vehicle". The "upper side in the vehicle height direction" in the aspect of the disclosure is the "upper side in the vehicle height direction in a state where the housing is installed on the floor portion of the vehicle".

In the case of the vehicle pedal device according to the above configuration, since the foreign substance entering the space enters the recess portion open to the upper side in the vehicle height direction, the foreign substance is likely to stay at a position ahead of the supporting position, at which the lower end portion of the pedal pad is supported, in the vehicle front-rear direction. Therefore, the foreign substance entering the space is prevented from moving to the supporting position side and thus the foreign substance is prevented from being interposed between the pedal pad and the support.

Therefore, it is possible to prevent a load from acting on the support with the foreign substance as a fulcrum when the pedal pad is stepped on.

In the vehicle pedal device according to the aspect of the disclosure, the housing may include a facing wall that faces the pedal pad and a protruding portion protruding toward the pedal pad from a predetermined position on the facing wall, the predetermined position being above a position where the smallest virtual circle is formed in a vehicle height direction, the protruding portion being disposed on the facing wall such that the protruding portion extends in a vehicle width direction.

The "vehicle width direction" in the aspect of the disclosure is "the vehicle width direction in a state where the housing is installed on the floor portion of the vehicle". The "upper side in the vehicle height direction" in the aspect of the disclosure is the "upper side in the vehicle height direction in a state where the housing is installed on the floor portion of the vehicle".

In the case of the vehicle pedal device according to the above configuration, the housing is provided with the facing wall configured to face the pedal pad and the protruding portion configured to protrude toward the pedal pad side from the position on the facing wall that is above the position where the smallest virtual circle is formed in the vehicle height direction. The protruding portion is disposed on the facing wall such that the protruding portion extends in the vehicle width direction.

Accordingly, the foreign substance that is about to pass through the area between the pedal pad and the housing comes into contact with the protruding portion and thus the foreign substance is prevented from passing through the area between the pedal pad and the housing. As a result, it is possible to prevent the foreign substance from entering the space.

In the vehicle pedal device according to the aspect of the disclosure, the housing may be installed on the floor portion while being disposed behind a floor carpet in the vehicle front-rear direction, the floor carpet being installed on the floor portion in a state of being inclined such that a height of the floor carpet becomes lower toward a rear side in the vehicle front-rear direction and the housing may include a front wall projecting upward beyond the floor carpet and inclined such that a height of the front wall becomes lower toward a front side in the vehicle front-rear direction.

The "rear side in the vehicle front-rear direction" in the aspect of the disclosure is the "rear side in the vehicle front-rear direction in a state where the housing is installed on the floor portion of the vehicle". The "front side in the vehicle front-rear direction" in the aspect of the disclosure is the "front side in the vehicle front-rear direction in a state where the housing is installed on the floor portion of the vehicle".

In the case of the vehicle pedal device according to the above configuration, even in a case where the foreign substance rolls toward the housing on the floor carpet which is installed on the floor portion in a state of being inclined such that the height of the floor carpet becomes lower toward the rear side in the vehicle front-rear direction, the foreign substance comes into contact with the front wall that projects upward beyond the floor carpet. In addition, the front wall is inclined such that the height of the front wall becomes lower toward the front side in the vehicle front-rear direction. Therefore, the foreign substance coming into contact with the front wall falls into an area ahead of the front wall.

Therefore, it is possible to prevent the foreign substance rolling toward the housing on the floor carpet from passing through the area between the pedal pad and the housing and entering the space.

In the vehicle pedal device according to the aspect of the disclosure, the pedal pad may include a wall portion disposed outward of the space in a vehicle width direction, the wall portion overlapping the space in the lateral view of the pedal pad.

The "outer side in the vehicle width direction" in the aspect of the disclosure is the "outer side in the vehicle width direction in a state where the housing is installed on the floor portion of the vehicle".

In the case of the vehicle pedal device according to the above configuration, the wall portion that is disposed outward of the space in the vehicle width direction overlaps the space as seen in the direction toward the pedal pad from the lateral side.

Therefore, it is possible to prevent the foreign substance from entering the space from a position outward of the space in the vehicle width direction.

In the vehicle pedal device according to the aspect of the disclosure, the support may be provided with an insertion groove open to an upper side in a vehicle height direction; the pedal pad may include a hinge portion provided at the lower end portion of the pedal pad; and the lower end portion may be rotatably attached to the support when the hinge portion is inserted into the in groove.

With the configuration as described above, the aspect of the disclosure has a more excellent effect that a load can be prevented from acting on a support when a pedal pad is stepped on even in a case where a foreign substance enters an area between a housing and the pedal pad.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a side sectional view illustrating a state where a pedal pad of the vehicle pedal device according to the embodiment is not stepped on;

FIG. 4 is a side sectional view illustrating a state where the pedal pad of the vehicle pedal device according to the embodiment is maximally stepped on;

FIG. 6 is a side sectional view illustrating a state where a pedal pad of a vehicle pedal device according to a comparative example is not stepped on;

FIG. 7 is a side sectional view illustrating a state where the pedal pad of the vehicle pedal device according to the comparative example is maximally stepped on;

FIG. 9 is a side sectional view illustrating a state where a pedal pad of the vehicle pedal device according to the modification example is not stepped on; and FIG. 10 is a side sectional view illustrating a state where the pedal pad of the vehicle pedal device according to the modification example is maximally stepped on.

DETAILED DESCRIPTION OF EMBODIMENTS

Hereinafter, an example of an embodiment of the disclosure will be described based on drawings. Arrows FR, UP, RH which are appropriately illustrated in each drawing represent a front side in a vehicle front-rear direction, an upper side in a vehicle height direction, and a right side in a vehicle width direction, respectively. Hereinafter, the vehicle front-rear direction, a vehicle right-left direction (vehicle width direction), and the vehicle height direction may be simply referred to as a front-rear direction, a right-left direction, and a height direction.

Vehicle Pedal Device 10

Figure 1:
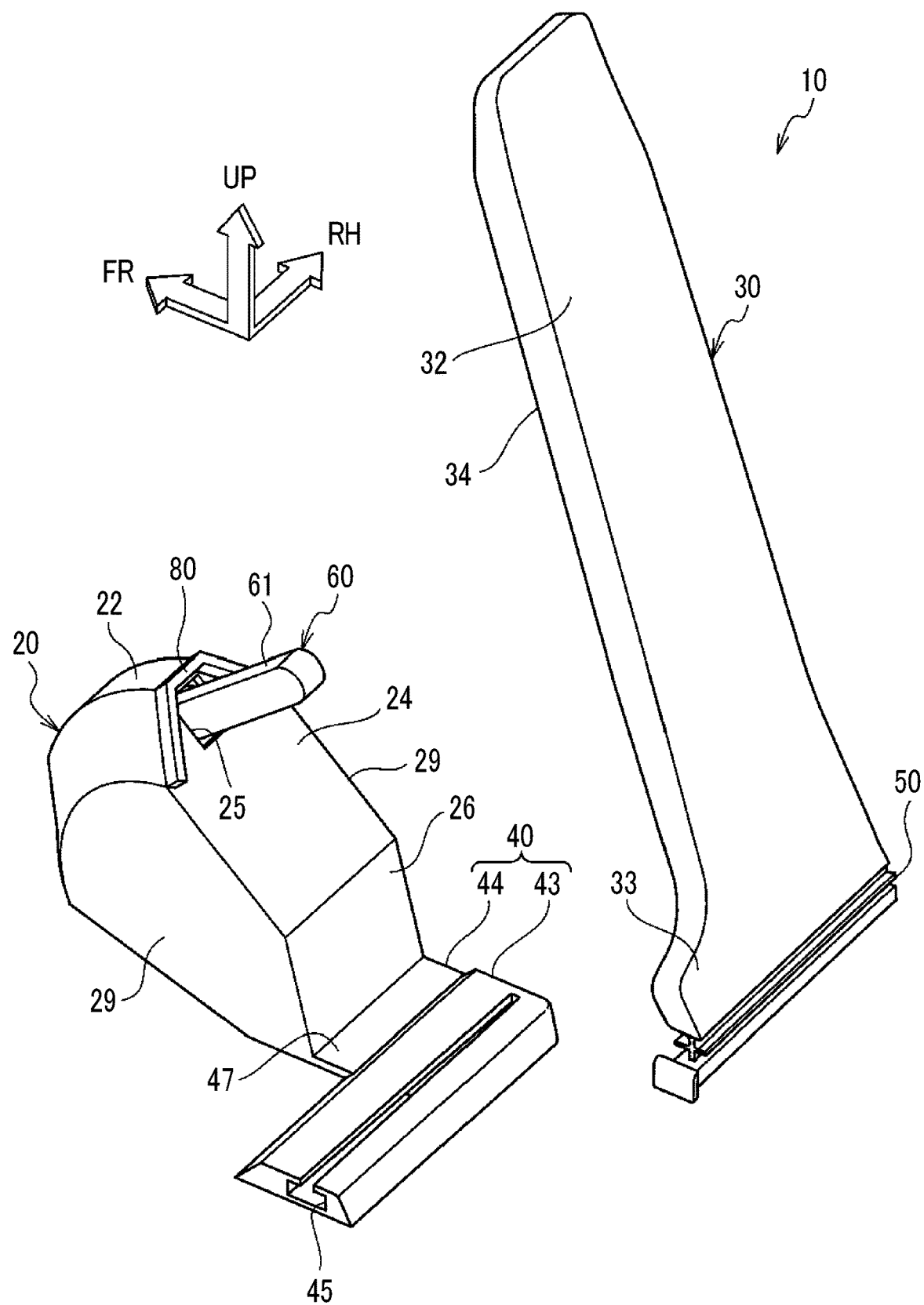
FIG. 1 is a perspective view illustrating the configuration of a vehicle pedal device according to an embodiment.

A configuration of a vehicle pedal device 10 according to the present embodiment will be described. FIG. 1 is a perspective view illustrating the configuration of the vehicle pedal device 10.

For example, the vehicle pedal device 10 is an organ type pedal device used as an accelerator pedal of an automobile, which is an example of a vehicle. Specifically, the vehicle pedal device 10 is provided with a housing 20, a support 40, a pedal pad 30, a link mechanism 60, and a protruding portion 80, as illustrated in FIG. 1. Hereinafter, specific configurations of the housing 20, the support 40, the pedal pad 30, the link mechanism 60, and the protruding portion 80 will be described.

Housing 20

Figure 2:
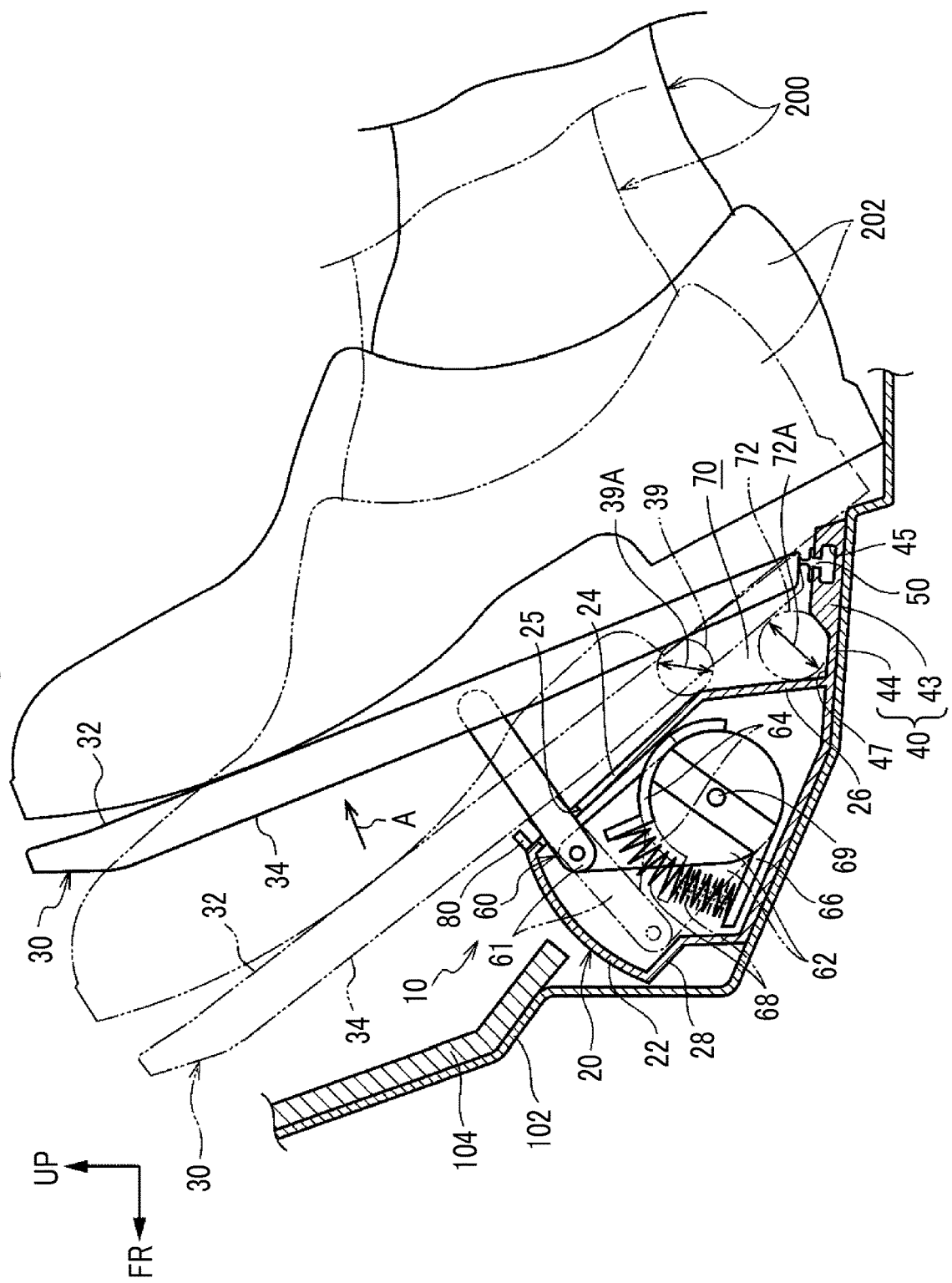
FIG. 2 is a side sectional view illustrating the configuration of the vehicle pedal device according to the embodiment.

As illustrated in FIG. 2, the housing 20 is a housing that accommodates the link mechanism 60 as a component. A portion of a first link 61 (which will be described later) constituting the link mechanism 60 is disposed outside the housing 20.

The housing 20 is installed on a floor panel 102 which is an example of a floor portion of an automobile. A floor carpet 104 is installed on the floor panel 102. The floor carpet 104 which is disposed ahead of the housing 20 in the vehicle front-rear direction is installed on the floor panel 102 in a state of being inclined such that the height of the floor carpet 104 becomes lower toward a rear side in the vehicle front-rear direction. In other words, the housing 20 is installed on the floor panel 102 while being disposed behind the floor carpet 104 in the vehicle front-rear direction, the floor carpet 104 being installed in a state of being inclined such that the height of the floor carpet 104 becomes lower toward a rear side in the vehicle front-rear direction.

Specifically, the housing 20 is formed into a box-shape and is provided with a front wall 22, an upper wall 24, a rear wall 26, an abutting wall 28, and a pair of side walls 29 (refer to FIG. 1), as illustrated in FIG. 2.

The upper wall 24 is a wall facing the upper side and the upper wall 24 faces a lower surface 34 of the pedal pad 30. That is, the upper wall 24 is an example of a facing wall of the housing 20, the facing wall facing the pedal pad 30. The upper wall 24 is a wall that is inclined along the pedal pad 30 such that the height thereof becomes higher toward the front side in the vehicle front-rear direction. Accordingly, an outer surface (front surface) of the upper wall 24 faces an oblique rearward and upward direction.

A through-hole 25, through which the first link 61 (which will be described later) passes, is formed in the upper wall 24. The through-hole 25 penetrates the upper wall 24 in the thickness direction of the upper wall 24.

The front wall 22 extends in an oblique forward and downward direction from a front end portion (upper end portion) of the upper wall 24. The front wall 22 is a wall that projects upward beyond the floor carpet 104 and that is inclined such that the height thereof becomes lower toward the front side in the vehicle front-rear direction. The front wall 22 is curved into an arch shape that protrudes in an oblique forward and upward direction.

The rear wall 26 extends downward from a rear end portion (lower end portion) of the upper wall 24. The rear wall 26 is a wall that is disposed to extend in the height direction and that faces the rear side in the vehicle front-rear direction. The rear wall 26 may be any wall as long as at least an angle between the rear wall 26 and the height direction (vertical direction) is smaller than an angle between the upper wall 24 and the height direction.

The abutting wall 28 extends in an oblique rearward and downward direction from a lower end portion of the front wall 22. The abutting wall 28 is a wall onto which a second link 62 (which will be described later) abuts. The side walls 29 illustrated in FIG. 1 are outer walls of the housing 20 in the vehicle width direction.

Support 40

As illustrated in FIG. 2, the support 40 is a structure that supports the pedal pad 30 and is installed on the floor panel 102. The support 40 is provided behind the housing 20 in the vehicle front-rear direction and is provided tot a lower portion of the housing 20. In other words, the support 40 is a portion that extends toward the rear side in the vehicle front-rear direction from the lower portion of the housing 20. Specifically, the support 40 is provided with an attachment portion 43 and a connection portion 44.

The attachment portion 43 is a portion to which the pedal pad 30 is attached. The attachment portion 43 has a plate-like shape of which the thickness direction is parallel to the height direction and is formed into an appropriately trapezoidal shape of which a lower base is longer than an upper base as seen from a lateral side. The expression "as seen from a lateral side" in the embodiment means a case where a vehicle is seen in a direction from one side to the opposite side in the vehicle width direction. The meaning of the expression "as seen from a lateral side" may be regarded to be substantially equal to the meaning of "in a lateral view of the pedal pad". As illustrated in FIG. 1, the attachment portion 43 projects toward a left side in the vehicle width direction further than the housing 20 and the width of the attachment portion 43 in the vehicle width direction is larger than the width of the housing 20.

An inset non groove 45 into which a hinge portion 50 provided for the pedal pad 30 is inserted is formed in the attachment portion 43. The insertion groove 45 is open to the left side in the vehicle width direction and the upper side in the vehicle height direction and is formed to have a reversed T-shape as seen from a lateral side.

The hinge portion 50 which is inserted into the insertion groove 45 functions as a connecting portion that connects the support 40 and the pedal pad 30 to each other. The hinge portion 50 is integrally provided with a lower end portion of the pedal pad 30. Specifically, the hinge portion 50 is formed to have a shape that is obtained by vertically stacking reversed T-shapes, as seen from a lateral side. A portion of the hinge portion 50 that is connected to the tower end portion of the pedal pad 30 is thin and the hinge portion 50 can be deformed such that an upper end portion of the pedal pad 30 swings (moves) in the vehicle front-rear direction about the lower end portion.

When the hinge portion 50 is inserted into the insertion groove 45 through an opening of the insertion groove 45 on the left side in the vehicle width direction, the pedal pad 30 is attached to the attachment portion 43. Accordingly, the lower end portion of the pedal pad 30 is rotatably supported by the attachment portion 43. Therefore, a position where the insertion groove 45 is formed is a supporting position at which the lower end portion of the peal pad 30 is supported by the attachment portion 43. Specifically, the pedal pad 30 can rotate such that the upper end portion thereof swings (moves) in the vehicle front-rear direction about the lower end portion.

The connection portion 44 is a portion that has a function of connecting the attachment portion 43 and the housing 20 to each other. The connection portion 44 is formed into a plate-like shape of which the thickness direction is parallel to the height direction. The height of the connection portion 44 is lower than that of the attachment portion 43. That is, an upper surface of the connection portion 44 is disposed at a position lower than an upper surface of the attachment portion 43.

In other words, a recess portion 47 is formed on a portion of an upper surface of the support 40 that corresponds to the connection portion 44. In other words, on the upper surface of the support 40, the recess portion 47 is formed at a position ahead of the supporting position, at which the lower end portion of the pedal pad 30 is supported, in the vehicle front-rear direction.

Pedal Pad 30

The pedal pad 30 is an operated portion which a driver 200 (refer to FIG. 2) steps on. Specifically, as illustrated in FIG. 2, a foot 202 of the driver 200 is placed on the pedal pad 30 and the pedal pad 30 is stepped on when a supping on force is applied thereto from the foot 202.

The pedal pad 30 is formed to have a plate-like shape. As illustrated in FIG. 1, the lower end portion of the pedal pad 30 has a projecting portion 33 that projects toward the left side in the vehicle width direction and the pedal pad 30 has an approximately rectangular shape that is long in the height direction as seen in a direction along an arrow A in FIG. 2 (width direction of pedal pad 30).

As illustrated in FIG. 2, the pedal pad 30 is disposed being inclined such that the pedal pad 30 extends in a direction from the support 40 to a position above the housing 20. That is, the pedal pad 30 is disposed being inclined such that the height of the pedal pad 30 becomes higher toward the front side in the vehicle front-rear direction. Accordingly, an upper surface 32 (front surface) of the pedal pad 30 faces au oblique rearward and upward direction. The lower surface 34 (rear surface) of the pedal pad 30 faces an oblique forward and downward direction. The foot 202 is placed on the upper surface 32 of the pedal pad 30 and a stepping on force from the foot 202 is applied to the upper surface 32. As described above, since the support 40 and the hinge portion 50 are provided, the pedal pad 30 can rotate such that the upper end portion thereof swings (moves) in the vehicle front-rear direction about the lower end portion.

Link Mechanism 60

The link mechanism 60 has a function of restricting the range of rotation of the pedal pad 30 to a range set in advance. In other words, the link mechanism 60 has a function of determining a specific range as the range of rotation of the pedal pad 30. With the link mechanism 60 being provided, the pedal pad 30 is configured to rotate within a range between a first position (position illustrated by solid line in FIG. 2) illustrated in FIG. 3 and a second position (position illustrated by two-dot chain line in FIG. 2) illustrated in FIG. 4.

Figure 3:
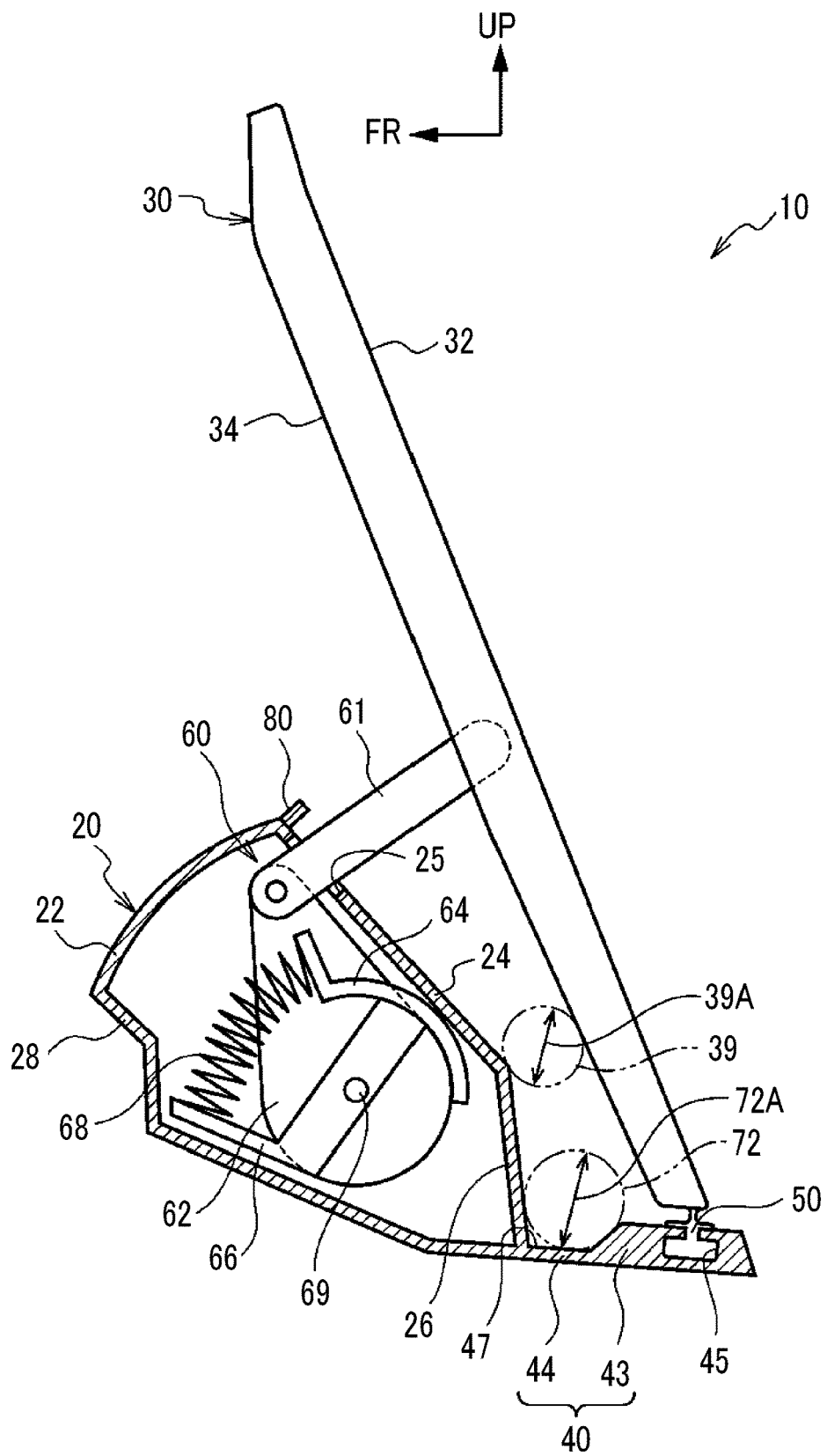
Figure 4:
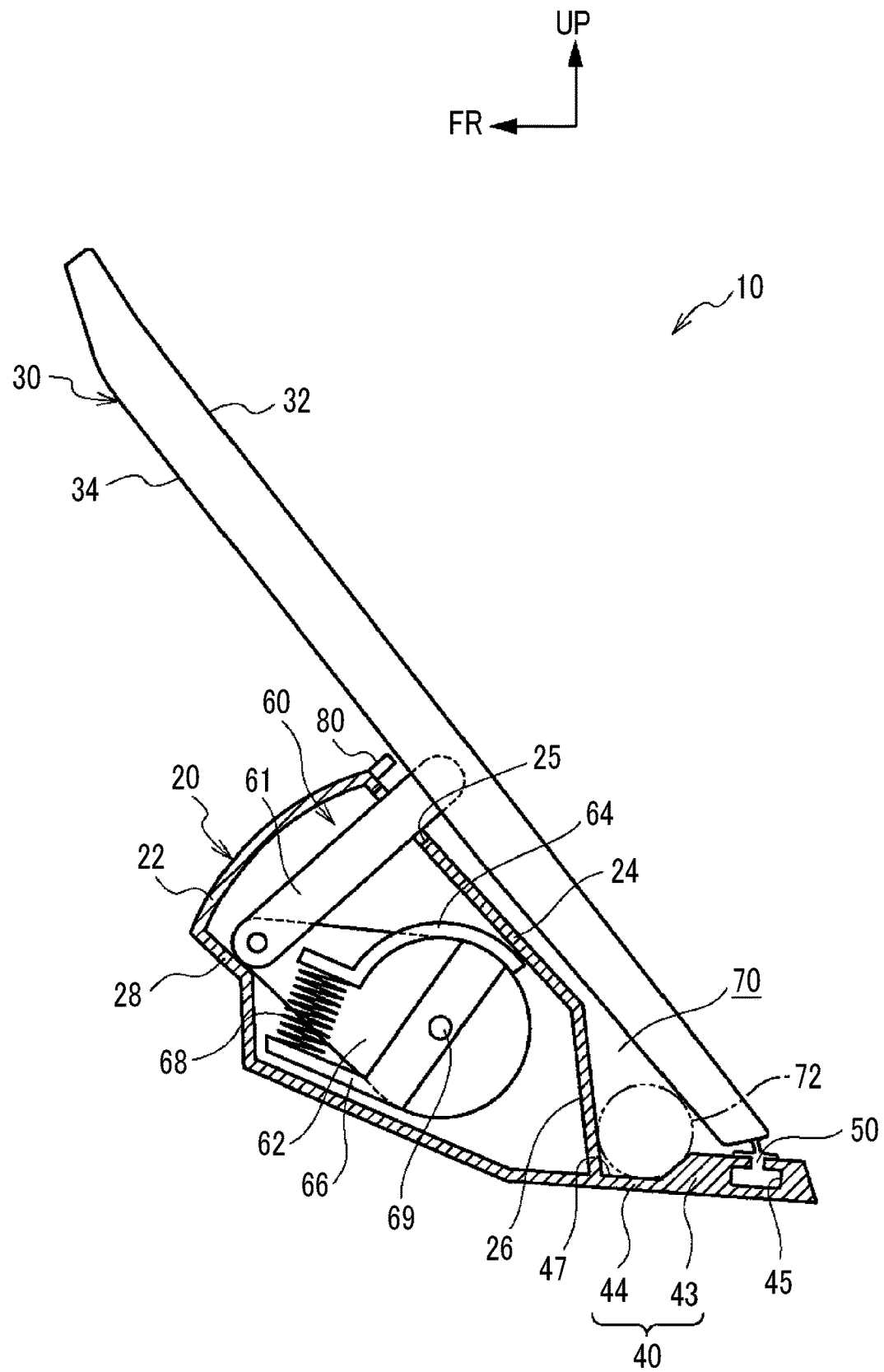

The link mechanism 60 has a function of urging the pedal pad 30 in a direction from the second position illustrated in FIG. 4 to the first position illustrated in FIG. 3. Therefore, the first position illustrated in FIG. 3 is an initial position at which the pedal pad 30 is positioned when the pedal pad 30 is not stepped on yet. In other words, the first position illustrated in FIG. 3 is a position at which the pedal pad 30 is positioned in a non-load state where there is no load acting on the upper surface 32 of the pedal pad 30.

The second position illustrated in FIG. 4 is a maximum stepping-on position at which the pedal pad 30 is positioned when the pedal pad 30 is maximally stepped on. Hereinafter, the first position will be referred to as the initial position and the second position will be referred to as the maximum stepping-on position.

For example, the link mechanism 60 is configured as follows. That is, as illustrated in FIGS. 3 and 4, the link mechanism 60 is prodded with the first link 61, the second link 62, a slider 64, a lever 66, and a coil spring 68.

The first link 61 passes through the through-hole 25 of the upper wall 24 of the housing 20. A first end portion of the first link 61 is rotatably connected to the pedal pad 30. A second end portion of the first link 61 is rotatably connected to a first end portion of the second link 62. A second end portion of the second link 62 is supported by the side wall 29 of the housing 20 such that the second end portion can rotate about a rotation shaft 69. Accordingly, the first end portion of the second link 62 can swing (move) in the height direction about the rotation shaft 69.

In the present embodiment, the pedal pad 30, the first link 61, and the second link 62 constitute a four-joint link structure in which the lower end portion of the pedal pad 30 and the second end portion of the second link 62 are fixed portions (portions that are not displaced).

When the first end portion of the second link 62 swings upward, the first end portion abuts onto a stopper (not shown), which is provided in the housing 20 and serves as a restriction portion, so that the swinging motion is restricted. Accordingly, rotation of the upper end portion of the pedal pad 30 in an upward direction is restricted. That is, a position (position illustrated in FIG. 3) at which the pedal pad 30 is positioned when the first end portion of the second link 62 abuts onto the stopper (not shown) is the initial position of the pedal pad 30.

When the first end portion of the second link 62 swings downward, as illustrated in FIG. 4, the first end portion abuts onto the abutting wall 28 of the housing 20 so that the swinging motion is restricted. Accordingly, rotation of the upper end portion of the pedal pad 30 in a downward direction is restricted. That is, a position (position illustrated in FIG. 4) at which the pedal pad 30 is positioned when the first end portion of the second link 62 abuts onto the abutting wall 28 is the maximum stepping-on position of the pedal pad 30.

The slider 64 is attached to the second end portion of the second link 62 and is configured to be integrally rotated with the second link 62 about the rotation shaft 69. The lever 66 is formed into an L-shape as seen from a lateral side. The lever 66 is fixed to the side wall 29 of the housing 20.

The coil spring 68 is disposed between the slider 64 and the lever 66. The first end portion of the second link 62 is urged upward by the coil spring 68. Accordingly, the pedal pad 30 is urged in a direction from the maximum stepping-on position to the initial position. As described above, the coil spring 68 functions as an urging member that urges the pedal pad 30 in a direction from the maximum stepping-on position to the initial position.

When a stepping-on force is applied to the pedal pad 30, as illustrated in FIG. 4, the pedal pad 30 rotates toward the maximum stepping-on position against an urging force from the coil spring 68. At this time, the coil spring 68 is compressed and deformed.

The rotation shaft 69 of the second link 62 is provided with an encoder (not shown) that measures a rotation amount of the second link 62. The encoder (not shown) measures a stepping-on amount of the pedal pad 30.

Space 70

Here, in the case of the vehicle pedal device 10, in a state where the pedal pad 30 is maximally stepped on (state where pedal pad 30 is positioned at maximum stepping-on position), a space 70 defined by the pedal pad 30, the rear wall 26 of the housing 20, and the support 40 in the above-described state is formed as illustrated in FIG. 4. The space 70 is formed to have an approximately triangular shape as seen from a lateral side.

In the space 70, a virtual circle 72 which is the largest virtual circle as seen from a lateral side can be formed. The virtual circle 72 is a virtual circle that is largest in diameter among virtual circles that can be virtually formed in the space 70. The virtual circle 72 is a virtual circle that is in contact with the rear wall 26 of the housing 20, the lower surface 34 of the pedal pad 30, and the support 40.

A diameter 72A of the virtual circle 72 is larger than a diameter 39A of a virtual circle 39 (refer to FIG. 3) which is the smallest virtual circle that is in contact with the pedal pad 30 in a state of being not stepped on (in state of being positioned at initial position) and the housing 20 as seen from a lateral side.

The virtual circle 39 is a virtual circle that is smallest in diameter among virtual circles that can be virtually formed between the pedal pad 30 in a state of being not stepped on and the housing 20. Specifically, the virtual circle is a virtual circle that is in contact with the lower surface 34 of the pedal pad 30 and a lower end portion of the upper wall 24 of the housing 20 as seen from a lateral side.

Protruding Portion 80

As illustrated in FIGS. 1 and 3, the protruding portion 80 protrudes toward the pedal pad 30 side from the upper wall 24 of the housing 20. The protruding portion 80 is erected to be perpendicular to the upper wall 24. The protruding portion 80 is disposed on the upper wall 24 of the housing 20 while extending in the vehicle width direction. Specifically, opposite end portions of the protruding portion 80 in the vehicle width direction are inclined downward while extending outward in the vehicle width direction. The protruding portion 80 is disposed to extend along an upper edge of the upper wall 24 of the housing 20.

Operation Effect of Vehicle Pedal Device 10

The operation effect of the vehicle pedal device 10 will be described.

Figure 5:
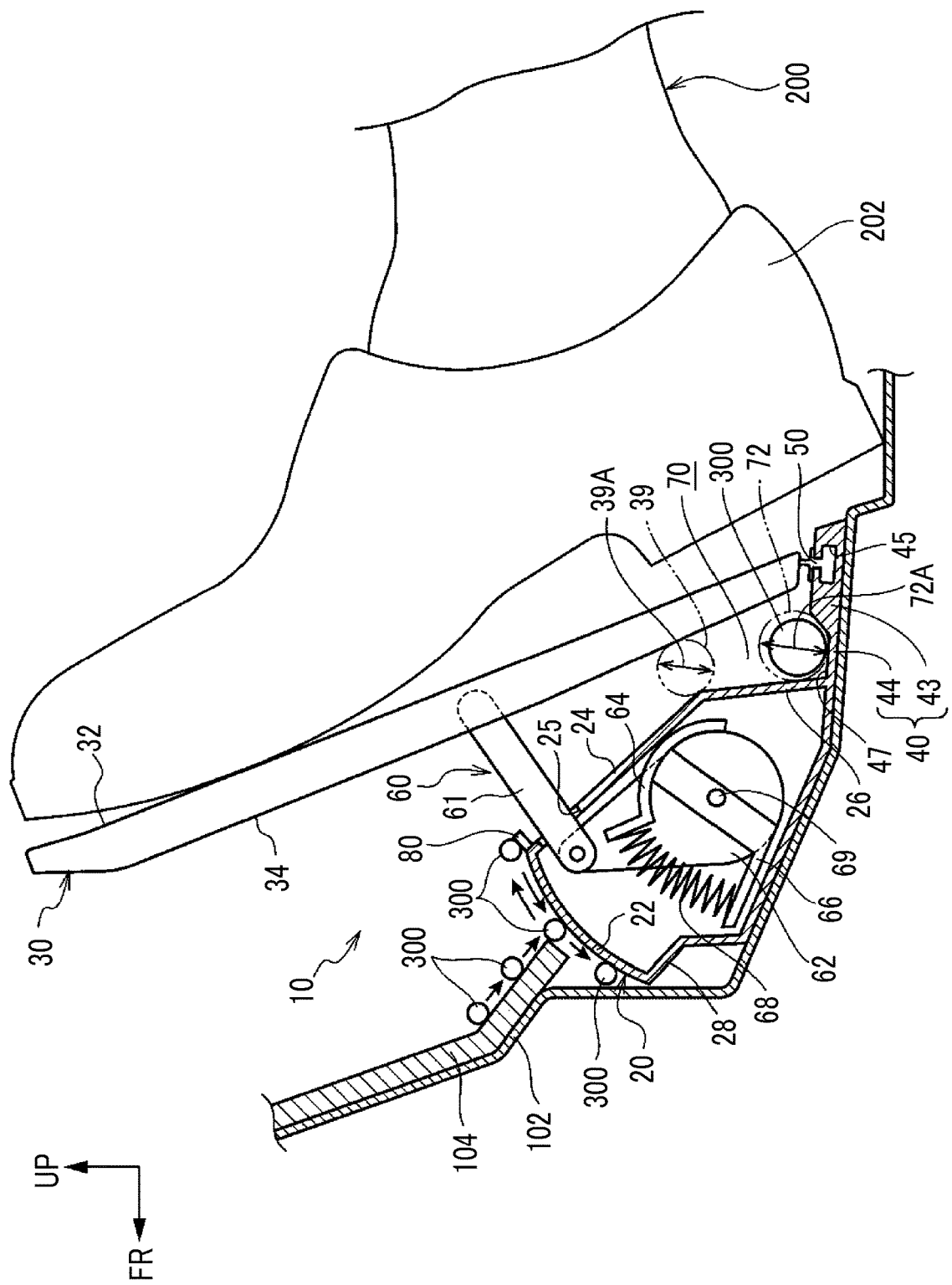
FIG. 5 is a side sectional view illustrating movement of a foreign substance rolling toward a housing on a floor carpet of the vehicle pedal device according to the embodiment.

In the vehicle pedal device 10 for example, even in a case where a foreign substance 300 rolls toward the housing 20 on the floor carpet 104 which is installed on the floor panel 102 in a state of being inclined such that the height of the floor carpet 104 becomes lower toward the rear side in the vehicle front-rear direction as illustrated in FIG. 5, the foreign substance 300 comes into contact with the front wall 22 that projects upward beyond the floor carpet 104. In addition, the front wall 22 is inclined such that the height of the front wall 22 becomes lower toward the front side in the vehicle front-rear direction. Therefore, the foreign substance 300 coming into contact with the front wall 22 falls into an area ahead of the front wall 22.

Therefore, it is possible to prevent the foreign substance 300 rolling toward the housing 20 on the floor carpet 104 from passing through an area between the pedal pad 30 and the housing 20 and entering the space 70.

For example, even when the foreign substance 300 rolling toward the housing 20 on the floor carpet 104 runs up the front wall 22, the foreign substance 300 comes into contact with the protruding portion 80 that protrudes from the upper wall 24 of the housing 20 and thus the foreign substance 300 is prevented from passing through the area between the pedal pad 30 and the housing 20. As a result, it is possible to prevent the foreign substance 300 from entering the space 70.

In the vehicle pedal device 10, the protruding portion 80 is disposed on the upper wall 24 of the housing 20 while extending in the vehicle width direction. Therefore, regardless of which position the foreign substance 300 on the housing 20 is positioned at in the vehicle width direction, the foreign substance 300 comes into contact with the protruding portion 80. Accordingly, it is possible to prevent the foreign substance 300 from passing through the area between the pedal pad 30 and the housing 20.

For example, even when the foreign substance 300 rolling toward the housing 20 on the floor carpet 104 climbs over the protruding portion 80, the size (diameter) of the largest foreign substance 300 that can pass through the area between the pedal pad 30 and the housing 20 in a state where the pedal pad 30 is not stepped on corresponds to the diameter 39A of the virtual circle 39.

Figure 6:
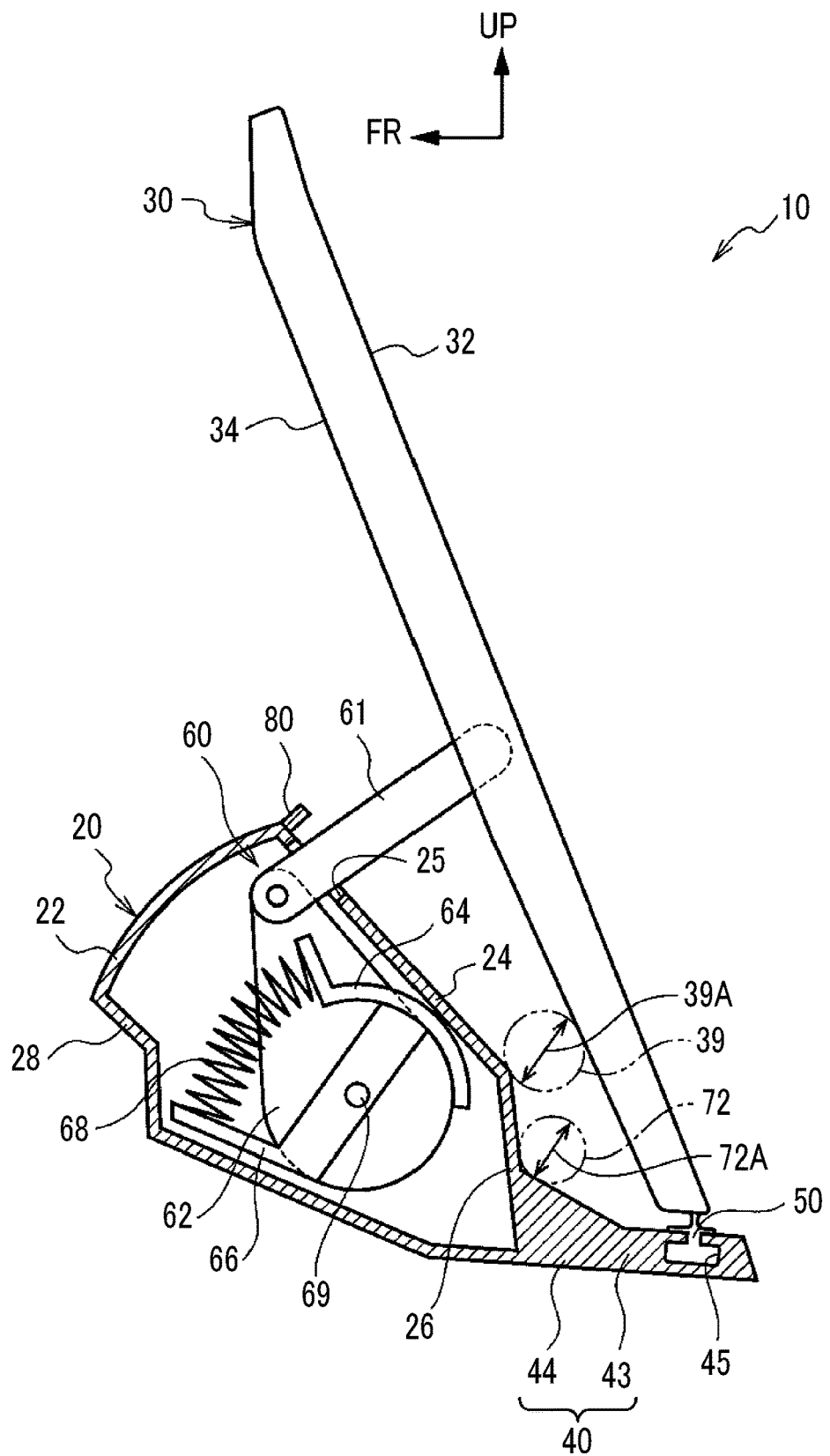
Figure 7:
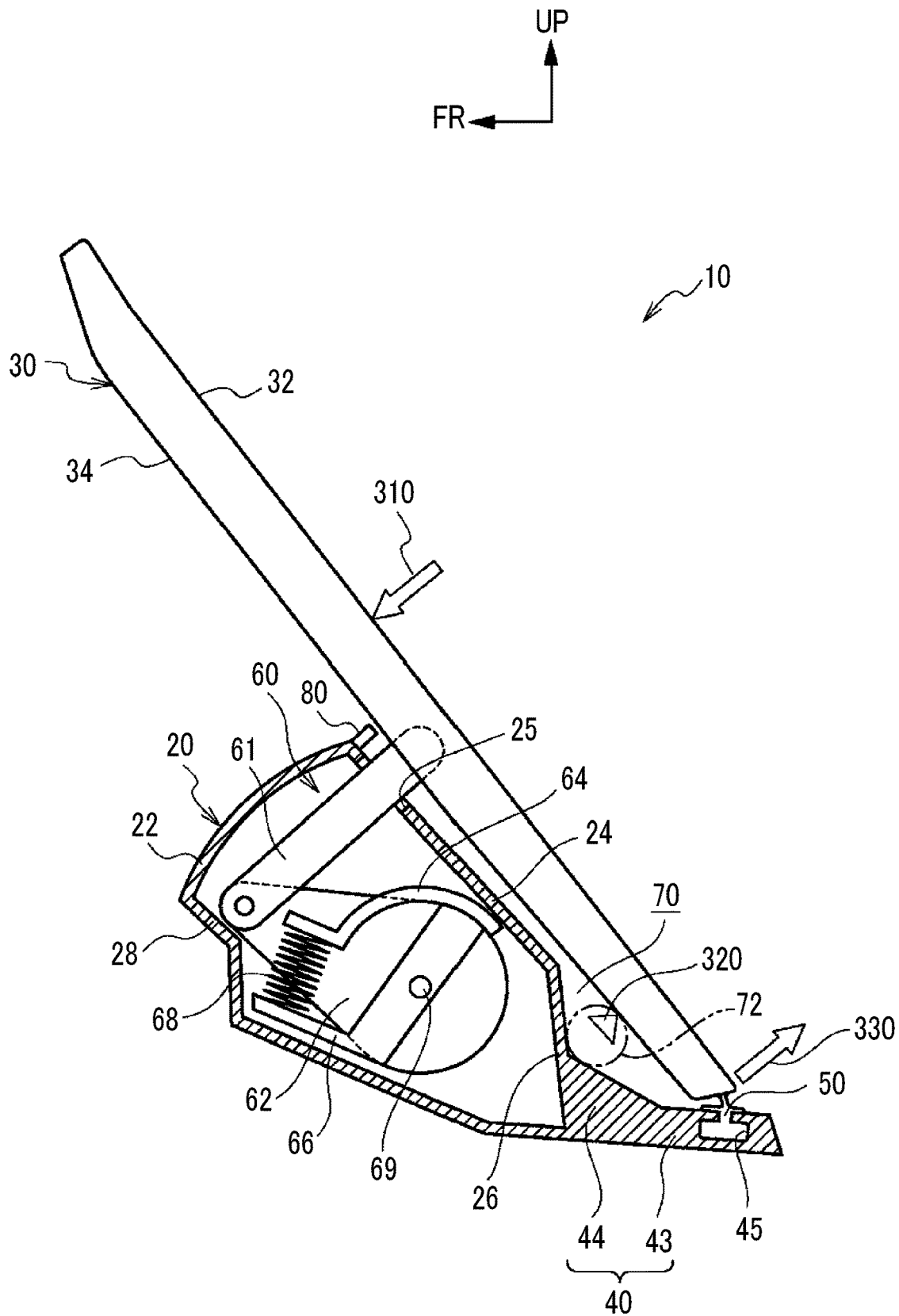

Here, as illustrated in FIGS. 6 and 7, in a configuration (comparative example) in which the diameter 72A of the virtual circle 72 which is the largest virtual circle that can be formed in the space 70 as seen from a lateral side is smaller than the diameter 39A of the virtual circle 39, the foreign substance 300 larger than the space 70 may pass through the area between the pedal pad 30 and the housing 20.

Therefore, a foreign substance entering the space 70 after passing through the area between the pedal pad 30 and the housing 20 is likely to stick out from the space 70. When a stepping-on force is applied to the pedal pad 30 with the foreign substance 300 sticking out from the space 70 (point of effort, refer to arrow 310 in FIG. 7), the foreign substance 300 may be interposed between the housing 20 and the pedal pad 30 and a load may act on the support 40 or the hinge portion 50 with the foreign substance 300 as a fulcrum (refer to 320 in FIG. 7) (point of load, refer to arrow 330 in FIG. 7). Particularly, when the foreign substance 300 is interposed at a position near the lower end portion (support 40) of the pedal pad 30, a relatively high load acts on the support 40 or the hinge portion 50 (connecting portion between the support 40 and the pedal pad 30) due to the principle of leverage.

On the contrary, in the vehicle pedal device 10, as illustrated in FIG. 5, the diameter 72A of the virtual circle 72 is larger than the diameter 39A of the virtual circle 39, Therefore, the foreign substance 300 entering the space 70 after passing through the area between the pedal pad 30 and the housing 20 is likely to be retained in the space 70. Accordingly, the foreign substance 300 is less likely to be interposed between the pedal pad 30 and the housing 20 or the pedal pad 30 and the support 40 when the pedal pad 30 is stepped on. Therefore, a load is prevented from acting on the support 40 or the hinge portion 50 (connecting portion between the support 40 and the pedal pad 30) with the foreign substance 300 as a fulcrum.

Therefore, with the vehicle pedal device 10, it is possible to prevent a load horn acting on the support 40 or the hinge portion 50 when the pedal pad 30 is stepped on even in a case where the foreign substance 300 enters the area between the housing 20 and the pedal pad 30.

In a case where the foreign substance 300 of which the size (diameter) is larger than the diameter 39A of the virtual circle 39 enters an area between the pedal pad 30 in a state of being not stepped on and the upper wall 24 of the housing 20, the foreign substance 300 cannot pass through the area between the pedal pad 30 and the upper wall 24. Therefore, there is a case where the foreign substance 300 stays between the pedal pad 30 and the upper wall 24. In such a case, the foreign substance 300 is interposed at a position distant from the lower end portion (hinge portion 50) of the pedal pad 30. Therefore, even when a load acts on the support 40 or the hinge portion 50 with the foreign substance 300 as a fulcrum, the load is small in comparison with a case where the foreign substance 300 in the space 70 serves as a fulcrum.

In the case of the vehicle pedal device 10, since the foreign substance 300 entering the space 70 enters the recess portion 47 of the support 40, the foreign substance 300 is likely to stay at a position ahead of the supporting position (hinge portion 50), at which the lower end portion of the pedal pad 30 is supported, in the vehicle front-rear direction. Therefore, the foreign substance 300 entering the space 70 is prevented from moving to the supporting position side and thus the foreign substance 300 is prevented from being interposed between the pedal pad 30 and the support 40.

Accordingly, it is possible to prevent a load from acting on the support 40 or the hinge portion 50 with the foreign substance 300 as a fulcrum when the pedal pad 30 is stepped on.

Forming the recess portion 47 on the upper surface of the support 40 also results in an effect of increasing the size of the space 70. In other words, forming the recess portion 47 on the upper surface of the support 40 also results in an effect of increasing the diameter 72A of the virtual circle 72.

Modification Example of Pedal Pad 30

Figure 8:
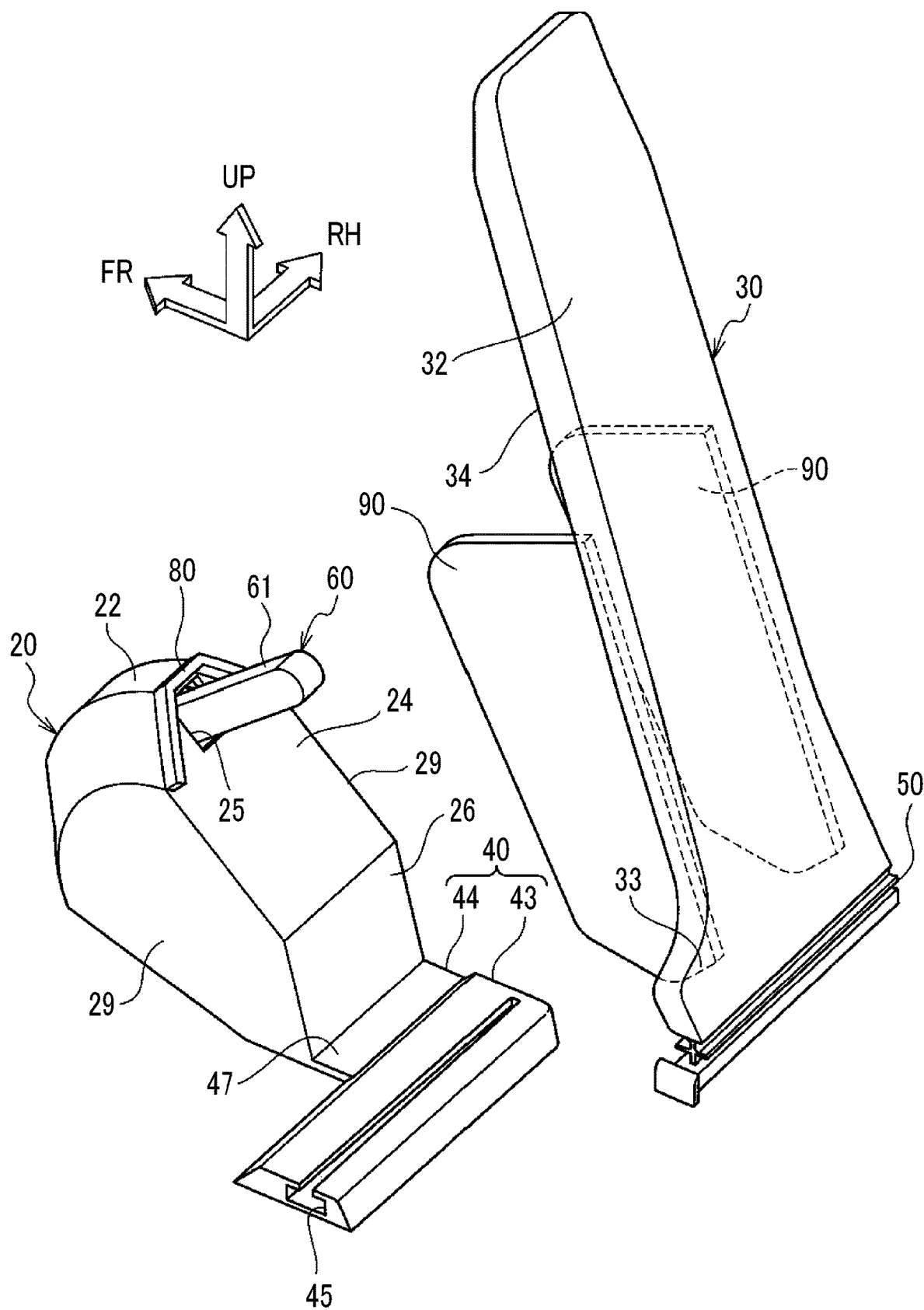
FIG. 8 is a perspective view illustrating the configuration of a vehicle pedal device according to a modification example.
Figure 9:
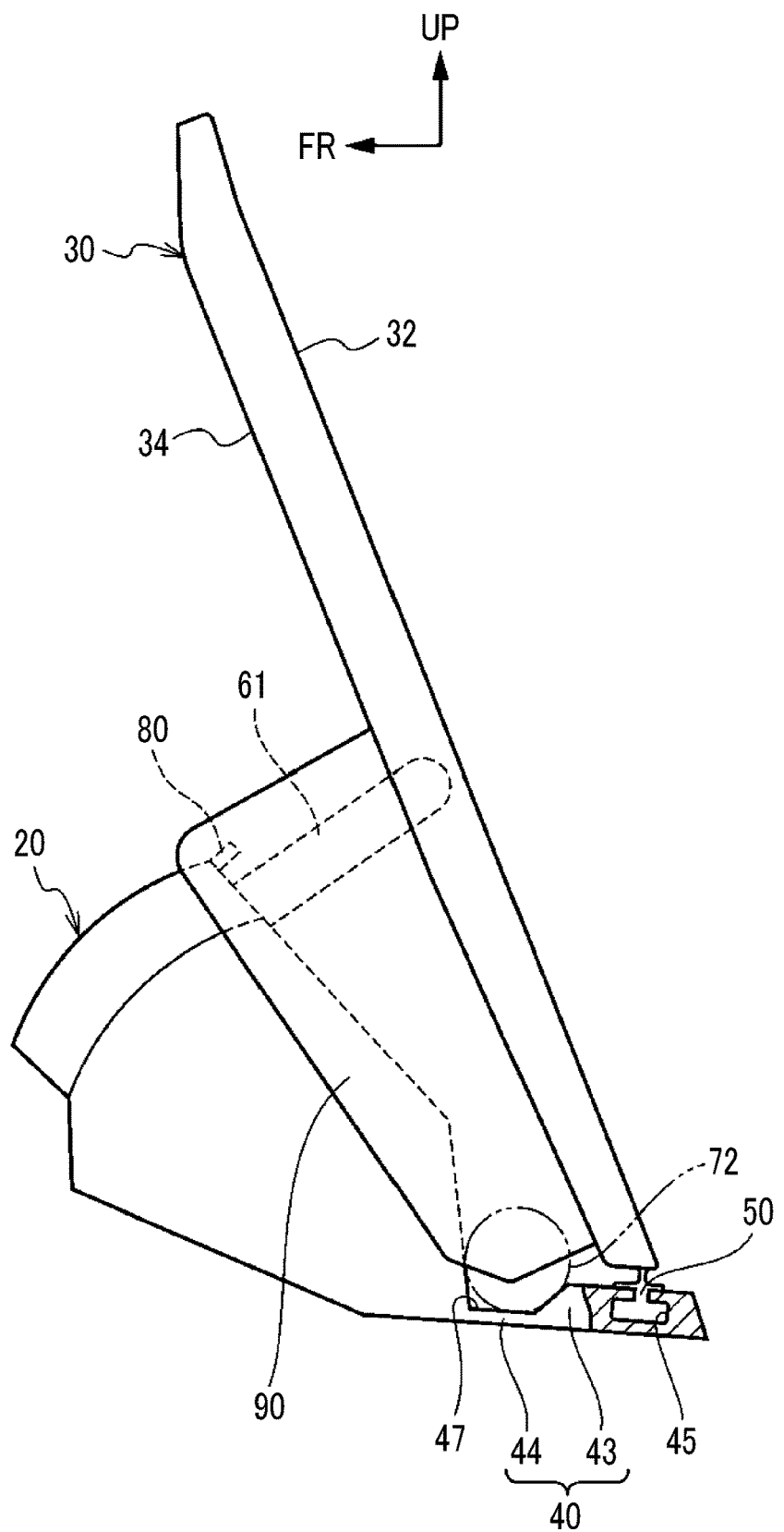
Figure 10:
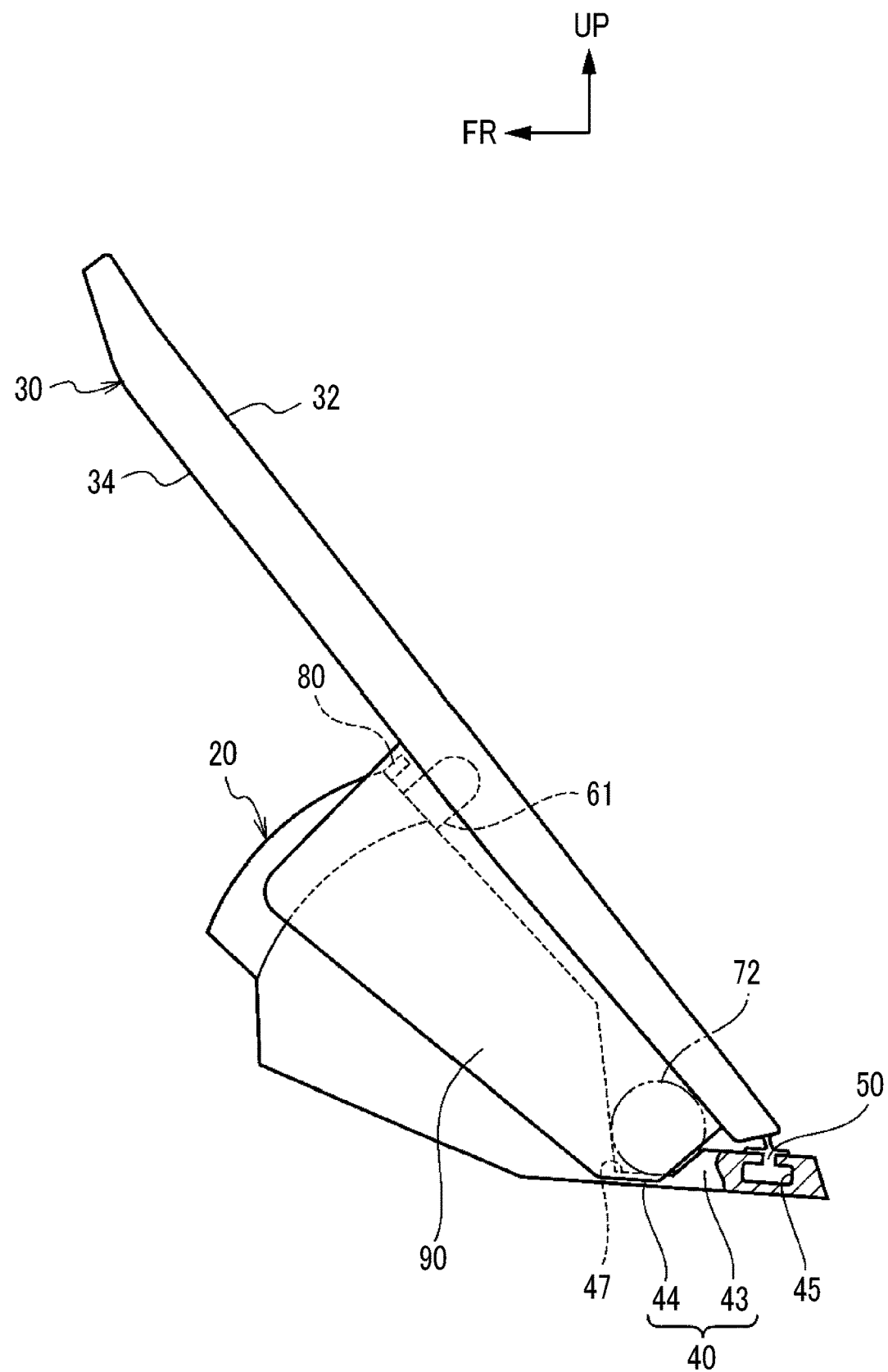

As illustrated in FIGS. 8, 9, and 10, the pedal pad 30 may be provided with a pair of wall portions 90. The wall portions 90 are disposed outward of the space 70 in the vehicle width direction.

As illustrated in FIG. 10, the wall portion 90 overlap the space 70 as seen from a lateral side. Specifically, the wall portions 90 overlap the space 70 as seen from a lateral side in a state where the pedal pad 30 is maximally stepped on (state where pedal pad 30 is positioned at maximum stepping-on position). As illustrated in FIG. 9, the wall portions 90 partially overlap an area in which the space 70 is formed as seen from a lateral side even in a state where the pedal pad 30 is not stepped on (state where pedal pad 30 is positioned at initial position).

According to the modification example, it is possible to prevent the foreign substance 300 from entering the space 70 from a position outward of the space 70 in the elude width direction. As a result, the foreign substance 300 is less likely to be interposed between the pedal pad 30 and the housing 20 or the pedal pad 30 and the support 40 when the pedal pad 30 is stepped on. Accordingly, it is possible to prevent a load from acting on the support 40 or the hinge portion 50 with the foreign substance 300 as a fulcrum.

Other Modification Examples

In the embodiment, the protruding portion 80 is disposed to extend along the upper edge of the upper wall 24.

However, the configuration is not limited to this. For example, the protruding portion 80 may be formed on any position on the upper wall 24 as long as the protruding portion 80 is positioned above a position where the virtual circle 39 is formed in the vehicle height direction. When the protruding portion 80 is formed to be positioned above a position where the virtual circle 39 is formed in the vehicle height direction as described above, the foreign substance 300 can be prevented from entering the space 70.

In the embodiment, the opposite end portions of the protruding portion 80 in the vehicle width direction are inclined downward while extending outward in the vehicle width direction. However, the configuration is not limited to this. For example, the protruding portion 80 may be formed to be linear in the vehicle width direction.

In the embodiment, the protruding portion 80 is erected to be perpendicular to the upper wall 24. However, the configuration is not limited to this. For example, the protruding portion 80 may be inclined with respect to the upper wall 24. Even in a case where the protruding portion 80 is inclined, movement of the foreign substance 300 toward the space 70 side is hindered and the foreign substance 300 can be prevented from entering the space 70.

In the embodiment, the support 40 rotatably supports the lower end portion of the pedal pad 30 via the hinge portion 50. However, the configuration is not limited to this. For example, a configuration in which the support 40 rotatably supports the lower end portion of the pedal pad 30 by using a rotation shaft extending in the vehicle width direction may also be adopted. In the case of the above-described configuration, it is possible to prevent a load from acting on the rotation shaft or the support 40 in a case where the foreign substance 300 enters the space 70.

In the embodiment, the vehicle pedal device 10 is an organ type pedal device used as an accelerator pedal of an automobile. However, the vehicle pedal device 10 is not limited to the organ type pedal device as described above. For example, the vehicle pedal device may be an organ type pedal device used as a brake pedal of an automobile.

An aspect of the disclosure is not limited to the embodiment and various changes, modifications, and improvements can be made without departing from the scope of the disclosure.

What is claimed is:

1. A vehicle pedal device comprising:
   a housing installed on a floor portion of a vehicle, the housing includes a front wall, an upper wall, and a linear rear wall;
   a support provided behind the housing in a vehicle front-rear direction and provided for a lower portion of the housing; and
   a pedal pad to be stepped on, the pedal pad being disposed while being inclined such that the pedal pad extends in a direction from the support to a position above the housing with a lower end portion of the pedal pad being rotatably supported by the support,
   wherein a diameter of a largest virtual circle accommodated in a space defined by the pedal pad in a state of being maximally stepped on, the housing, and the support is larger than a diameter of a smallest virtual circle being in contact with the pedal pad in a state of being not stepped on and the housing as seen in a lateral view of the pedal pad.

2. The vehicle pedal device according to claim 1, wherein a portion of an upper surface of the support that defines the space is provided with a recess portion open to an upper side in a vehicle height direction, the recess portion being positioned ahead of a supporting position, at which the lower end portion is connected to the support, in the vehicle front-rear direction.

3. The vehicle pedal device according to claim 1, wherein the housing includes a facing wall that faces the pedal pad and a protruding portion protruding toward the pedal pad from a predetermined position on the facing wall, the predetermined position being above a position where the smallest virtual circle is formed in a vehicle height direction, the protruding portion being disposed on the facing wall such that the protruding portion extends in a vehicle width direction.

4. The vehicle pedal device according to claim 1, wherein:
the housing is installed on the floor portion while being disposed behind a floor carpet in the vehicle front-rear direction, the floor carpet being installed on the floor portion in a state of being inclined such that a height of the floor carpet becomes lower toward a rear side in the vehicle front-rear direction; and
the housing includes a front wall projecting upward beyond the floor carpet and inclined such that a height of the front wall becomes lower toward a front side in the vehicle front-rear direction.

5. The vehicle pedal device according to claim 1, wherein the pedal pad includes a wall portion disposed outward of the space in a vehicle width direction, the wall portion overlapping the space in the lateral view of the pedal pad.

6. The vehicle pedal device according to claim 1, wherein:
the support is provided with an insertion groove open to an upper side in a vehicle height direction;
the pedal pad includes a hinge portion provided at the lower end portion of the pedal pad; and
the lower end portion is rotatably attached to the support when the hinge portion is inserted into the insertion groove.

7. A vehicle pedal device comprising:
a housing installed on a floor portion of a vehicle, the housing includes a front wall, an upper wall, a rear wall, an abutting wall, a protruding portion, and a pair of side walls, the upper wall faces the pedal pad;
a support provided behind the housing in a vehicle front-rear direction, the support extends from a lower portion of the rear wall of the housing; and
a pedal pad to be stepped on, the pedal pad being disposed while being inclined such that the pedal pad extends in a direction from the support to a position above the housing with a lower end portion of the pedal pad being rotatably supported by the support,
wherein a diameter of a largest virtual circle accommodated in a space defined by the pedal pad in a state of being maximally stepped on, the rear wall of the housing, and the support is larger than a diameter of a smallest virtual circle being in contact with the pedal pad in a state of being not stepped on and a lower end portion of the upper wall of the housing as seen in a lateral view of the pedal pad, and
wherein the protruding portion protrudes toward the pedal pad from a predetermined position on the upper wall, the predetermined position being above a position where the smallest virtual circle is formed in a vehicle height direction, the protruding portion being disposed on the upper wall such that the protruding portion extends in a vehicle width direction.

8. The vehicle pedal device according to claim 7, wherein a portion of an upper surface of the support that defines the space is provided with a recess portion open to an upper side in the vehicle height direction, the recess portion being positioned ahead of a supporting position, at which the lower end portion is connected to the support, in the vehicle front-rear direction.

9. The vehicle pedal device according to claim 7, wherein:
the housing is installed on the floor portion while being disposed behind a floor carpet in the vehicle front-rear direction, the floor carpet being installed on the floor portion in a state of being inclined such that a height of the floor carpet becomes lower toward a rear side in the vehicle front-rear direction; and
the front wall projects upward beyond the floor carpet and inclined such that a height of the front wall becomes lower toward a front side in the vehicle front-rear direction.

10. The vehicle pedal device according to claim 7, wherein
the pedal pad includes a wall portion disposed outward of the space in the vehicle width direction, the wall portion overlapping the space in the lateral view of the pedal pad.

11. The vehicle pedal device according to claim 7, wherein:
the support is provided with an insertion groove open to an upper side in a vehicle height direction;
the pedal pad includes a hinge portion provided at the lower end portion of the pedal pad; and
the lower end portion is rotatably attached to the support when the hinge portion is inserted into the insertion groove.

12. A vehicle pedal device comprising:
a housing installed on a floor portion of a vehicle, the housing includes a front wall, an upper wall, and a linear rear wall, an angle between the linear rear wall and a vertical direction is smaller than an angle between the upper wall and the vertical direction;
a support provided behind the housing in a vehicle front-rear direction and provided for a lower portion of the housing; and
a pedal pad to be stepped on, the pedal pad being disposed while being inclined such that the pedal pad extends in a direction from the support to a position above the housing with a lower end portion of the pedal pad being rotatably supported by the support,
wherein a diameter of a largest virtual circle accommodated in a space defined by the pedal pad in a state of being maximally stepped on, the housing, and the support is larger than a diameter of a smallest virtual circle being in contact with the pedal pad in a state of being not stepped on and the housing as seen in a lateral view of the pedal pad.

13. The vehicle pedal device according to claim 12, wherein
a portion of an upper surface of the support that defines the space is provided with a recess portion open to an upper side in a vehicle height direction, the recess portion being positioned ahead of a supporting position, at which the lower end portion is connected to the support, in the vehicle front-rear direction.

14. The vehicle pedal device according to claim 12, wherein
the housing includes a facing wall that faces the pedal pad and a protruding portion protruding toward the pedal pad from a predetermined position on the facing wall, the predetermined position being above a position where the smallest virtual circle is formed in a vehicle height direction, the protruding portion being disposed on the facing wall such that the protruding portion extends in a vehicle width direction.

15. The vehicle pedal device according to claim 12, wherein:
the housing is installed on the floor portion while being disposed behind a floor carpet in the vehicle front-rear direction, the floor carpet being installed on the floor portion in a state of being inclined such that a height of the floor carpet becomes lower toward a rear side in the vehicle front-rear direction; and
the housing includes a front wall projecting upward beyond the floor carpet and inclined such that a height of the front wall becomes lower toward a front side in the vehicle front-rear direction.

16. The vehicle pedal device according to claim 12, wherein
the pedal pad includes a wall portion disposed outward of the space in a vehicle width direction, the wall portion overlapping the space in the lateral view of the pedal pad.

17. The vehicle pedal device according to claim 12, wherein:
the support is provided with an insertion groove open to an upper side in a vehicle height direction;
the pedal pad includes a hinge portion provided at the lower end portion of the pedal pad; and
the lower end portion is rotatably attached to the support when the hinge portion is inserted into the insertion groove.

* * * * *

UNITED STATES PATENT AND TRADEMARK OFFICE
CERTIFICATE OF CORRECTION

PATENT NO. : 10,620,658 B2
APPLICATION NO. : 16/142816
DATED : April 14, 2020
INVENTOR(S) : Hironori Kadoi It is certified that error appears in the above-identified patent and that said Letters Patent is hereby corrected as shown below:

On the Title Page

Item (72), inventor city, delete "Toyota" and insert --Toyota-shi Aichi-ken--, therefor.

In the Specification

In Column 1, Line(s) 16, delete "relates," and insert --relates--, therefor.

In Column 1, Line(s) 20, delete "JP 2010-073141 A" and insert --JP 2010-073143 A--, therefor.

In Column 1, Line(s) 67, after "supported", delete "b" and insert --by--, therefor.

In Column 4, Line(s) 10, before "groove", delete "in" and insert --insertion--, therefor.

In Column 6, Line(s) 15, delete "tot" and insert --for--, therefor.

In Column 6, Line(s) 38, before "groove", delete "inset non" and insert --insertion--, therefor.

In Column 6, Line(s) 51, delete "tower" and insert --lower--, therefor.

In Column 6, Line(s) 63, delete "peal" and insert --pedal--, therefor.

In Column 7, Line(s) 23 & 24, delete "supping on" and insert --stepping-on--, therefor.

In Column 7, Line(s) 38, after "faces", delete "au" and insert --an--, therefor.

In Column 8, Line(s) 11, delete "prodded" and insert --provided--, therefor.

In Column 9, Line(s) 30, delete "virtual circle" and insert --virtual circle 39--, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,620,658 B2

In Column 9, Line(s) 53, delete "device 10" and insert --device 10,--, therefor.

In Column 10, Line(s) 54, delete "virtual circle 39," and insert --virtual circle 39.--, therefor.

In Column 10, Line(s) 66, delete "horn" and insert --from--, therefor.

In Column 11, Line(s) 44, delete "wall portion 90" and insert --wall portions 90--, therefor.

In Column 11, Line(s) 56, delete "elude" and insert --vehicle--, therefor.